(12) United States Patent  (10) Patent No.: US 7,525,763 B2
Yao et al. (45) Date of Patent: Apr. 28, 2009

(54) HEAD GIMBAL ASSEMBLY WITH PARTICLE FILTER DEVICE, AND DISK DRIVE UNIT WITH THE SAME

(75) Inventors: MingGao Yao, DongGuan (CN); Masashi Shiraishi, HongKong (CN)

(73) Assignee: Sae Magnetics (H.K.) Ltd., Hong Kong (HK)

( * ) Notice: Subject to any disclaimer, the term of this patent is extended or adjusted under 35 U.S.C. 154(b) by 624 days.

(21) Appl. No.: 11/190,045

(22) Filed: Jul. 27, 2005

(65) Prior Publication Data

US 2007/0025020 A1 Feb. 1, 2007

(51) Int. Cl.
*G11B 5/60* (2006.01)
(52) U.S. Cl. .................................... 360/234.3
(58) Field of Classification Search ............... 360/235.5, 360/236.2, 234.6
See application file for complete search history.

(56) References Cited

U.S. PATENT DOCUMENTS

| | | | | |
|---|---|---|---|---|
| 5,276,573 A * | 1/1994 | Harada et al. ............ | 360/235.3 |
| 6,344,949 B1 * | 2/2002 | Albrecht et al. ........... | 360/236.5 |
| 6,665,150 B2 * | 12/2003 | Smith ....................... | 360/265.7 |
| 6,724,560 B2 * | 4/2004 | Koganezawa et al. ..... | 360/77.02 |
| 6,920,015 B2 * | 7/2005 | Mundt et al. .............. | 360/235.6 |
| 6,970,332 B2 * | 11/2005 | Tetsukawa et al. ........ | 360/324.1 |
| 2002/0145828 A1 * | 10/2002 | Mundt et al. .............. | 360/235.6 |
| 2004/0075956 A1 * | 4/2004 | Tetsukawa et al. ........ | 360/324.1 |
| 2005/0190500 A1 * | 9/2005 | Song ........................ | 360/235.5 |

* cited by examiner

*Primary Examiner*—Allen T Cao
(74) *Attorney, Agent, or Firm*—Nixon & Vanderhye P.C.

(57) ABSTRACT

A HGA includes a slider, a suspension to load the slider, and a particle filter device to fix in leading side of the slider. The particle filter device is made of power material or porous material. The HGA further comprise a micro-actuator to connect with the slider. Because the particle filter device is positioned on the leading edge of the slider that is a passage of the particles, so the particles generating from the components in the disk drive unit, such as the HGA will be catched by the particle filter device. Thus the particles will be prevented from flying on the disk and deposited on ABS of the slider, this will ensure the slider to read from/write to data information to the disk successfully and eliminate a possibility to damage the slider/the disk. A disk drive unit with such an HGA is also disclosed herein.

9 Claims, 7 Drawing Sheets

HEAD GIMBAL ASSEMBLY WITH PARTICLE FILTER DEVICE, AND DISK DRIVE UNIT WITH THE SAME

FIELD OF THE INVENTION

The present invention relates to a disk drive unit, and more particularly to a head gimbal assembly (HGA) with a particle filter device to catch particles generating from components in the disk drive unit.

BACKGROUND OF THE INVENTION

Disk drives are information storage devices that use magnetic media to store data. Referring to FIG. 1, a traditional disk drive includes a magnetic disk 101 and a drive arm 105 for driving a HGA 106 with a slider 103 mounted thereon. The disk 101 is mounted on a spindle motor 104 which causes the disk 101 to spin. A primary actuator, such as voice-coil motor (VCM) 102 is provided for controlling the motion of the drive arm 105 and, in turn, controlling the slider 103 to move from track to track across the surface of the disk 101, thereby enabling the slider 103 to read data from or write data to the disk 101. In operation, a lift force is generated by the aerodynamic interaction between the slider 103 and the spinning magnetic disk 101. The lift force is opposed by equal and opposite spring forces applied by the suspension of the HGA 106 such that a predetermined flying height above the surface of the spinning disk 101 is maintained over a full radial stroke of the drive arm 106.

However, the components in the disk drive unit, such as the HGA is easy to generate particles during operation. As is known to all, the generated particles are prone to deposit on air bearing surface (ABS) of the slider when the slider flying on the disk. Such particle deposition will greatly affect the slider to read from/write to data information to the disk, in some circumstance, may damage the slider or the disk.

Hence it is desired to provide a HGA having a particle filter device, and a disk drive with such a HGA which can overcome the foregoing drawbacks of the related art.

SUMMARY OF THE INVENTION

A main feature of the present invention is to provide a HGA with a particle filter device, which can catch particles generating from components in a disk drive unit and then prevent the particles from depositing on ABS of a slider.

Another feature of the present invention is to provide a disk drive unit with such a HGA.

To achieve the above-mentioned feature, a HGA of the invention comprises a slider; a suspension to load the slider; and a particle filter device to fix in leading side of the slider. In an embodiment, the particle filter device is quadrate. The particle filter device may be made of power material or porous material. The particle filter device comprises a particle filter part having a plurality of small room therein; and a holding means to hold the particle filter part. In an embodiment, the particle filter device is mounted on the suspension by epoxy or adhesive. In a further embodiment, the HGA further comprises a micro-actuator to connect with the slider. The particle filter device is mounted inside of the micro-actuator.

A disk drive unit of the present invention comprises a HGA, a drive arm to connect with the HGA; a disk; and a spindle motor to spin the disk. In the invention, the HGA includes a slider; suspension to load the slider; and a particle filter device to fix in leading side of the slider.

Compared with the prior art, because the particle filter device of the invention is positioned on the leading edge of the slider that is a passage of the particles, so the particles generating from the components in the disk drive unit, such as the HGA will be caught by the particle filter device. Thus the particles will be prevented from flying on the disk and deposited on ABS of the slider, this will ensure the slider to read from/write to data information to the disk successfully and eliminate a possibility to damage the slider/the disk.

For the purpose of making the invention easier to understand, several particular embodiments thereof will now be described with reference to the appended drawings in which:

DETAILED DESCRIPTION OF THE INVENTION

Various preferred embodiments of the present invention will now be described with reference to the figures. As indicated above, the present invention is designed to provide a HGA with a particle filter device, which can catch particles generating from components in a disk drive unit, such as a HGA, and then prevent the particles from depositing on ABS of a slider, accordingly, the slider will have no trouble to read from/write to data information to a disk. The particle filter device is fixed in leading side of the slider for catching the particles more conveniently and reliable. Several example embodiments of the invention will now be described. It is noted that the invention is not limited to such implementations. Instead, the HGA with a particle filter device of the invention can be implemented in any suitable disk drive units.

Figure 1:
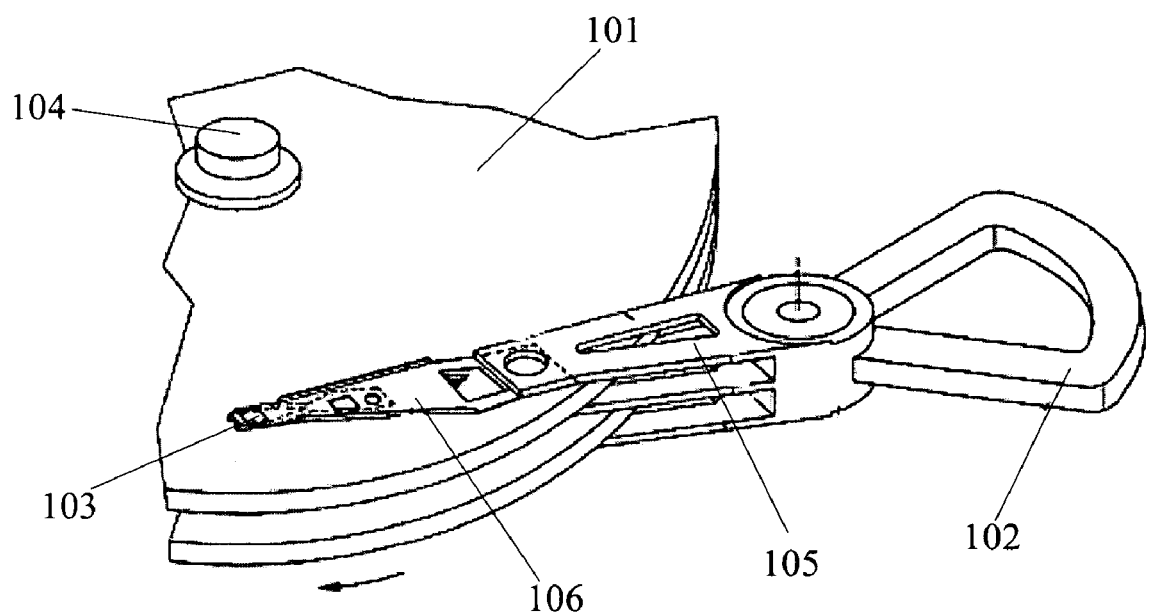
FIG. 1 is a partial, perspective view of a traditional disk drive.
Figure 2:
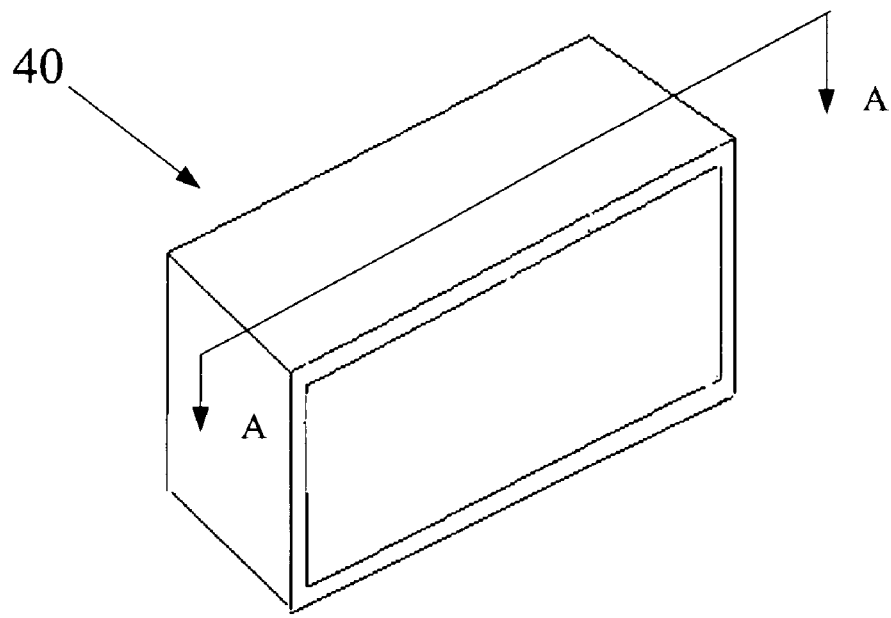
FIG. 2 is a perspective view of a particle filter device according to an embodiment of the invention.
Figure 3:
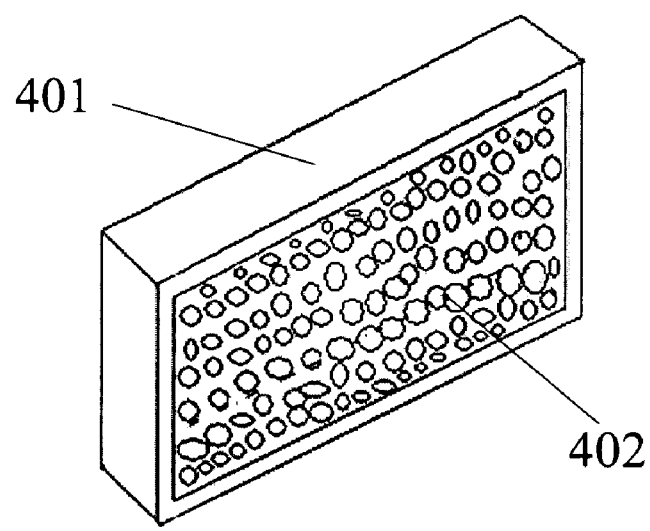
FIG. 3 is a cross-sectional view of FIG. 2 taken along line A-A.

Referring to FIGS. 2-3, according to an embodiment of the invention, a particle filter device 40 is quadrate that is adapted to the slider's shape, so that the particles flying to the slider are more reliable to be blocked for no gap left for the particles to enter. The particle filter device 40 comprises a particle filter part 402 and an outer shield 401 to hold the particle filter part 402. According to an embodiment of the invention, the particle filter part 402 is constituted by powder material, preferably dry powder. Selectively, the particle filter part 402 can be constituted by porous material, such as cotton or polymer fiber. The material is used to form a plurality of small rooms in the particle filter part 402 for receiving particles producing from components in the disk drive, such as the HGA. Obviously, the particle filter part 402 can also be formed from soft net material with dry powder sandwiched therein. As an embodiment, the outer shield 401 is box-shaped which has a structure to permit particles enter into the particle filter part 402. It is obviously that the structure of the particle filter device 40 is not limited to the above-mentioned structure, any suitable structure with small rooms therein can be implemented to the present invention. In another embodiment, the particle filter device 40 maybe only have a particle filter part which is made from a porous material.

Figure 4:
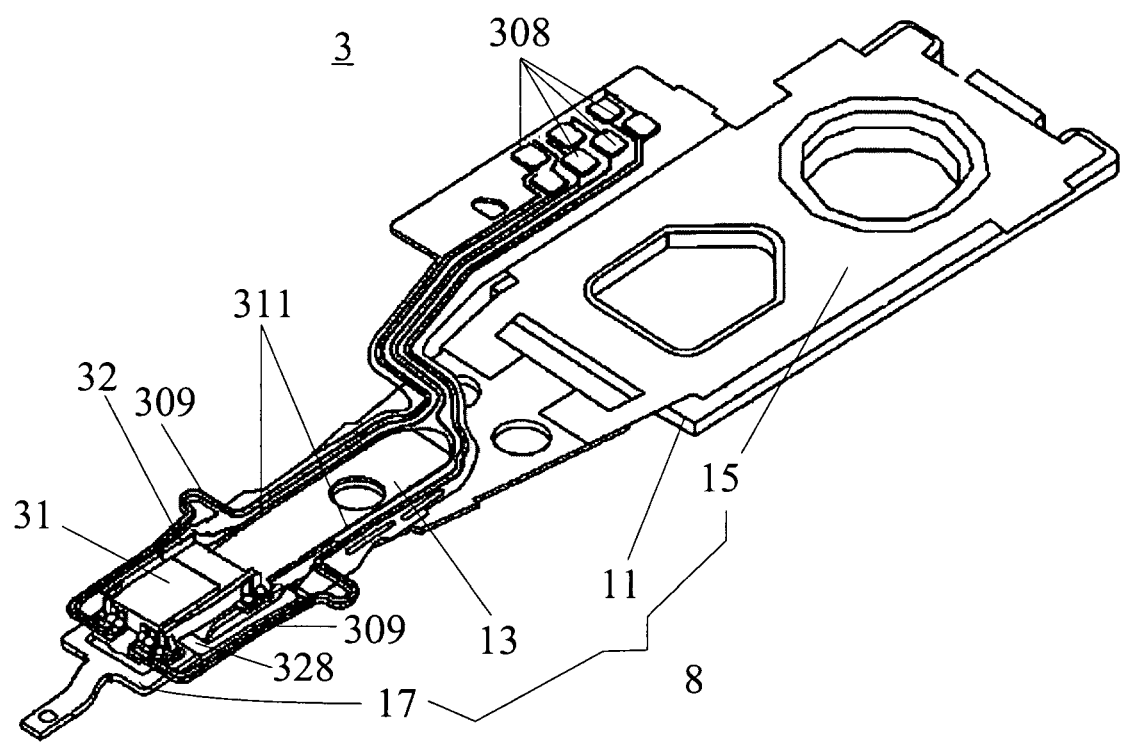
FIG. 4 is a perspective view of a HGA according to a first embodiment of the present invention.

Referring to FIG. 4, according to an embodiment of the invention, a head gimbal assembly (HGA) 3 comprises a slider 31, a micro-actuator 32 and a suspension 8 to load the slider 31 and the micro-actuator 32.

Figure 5:
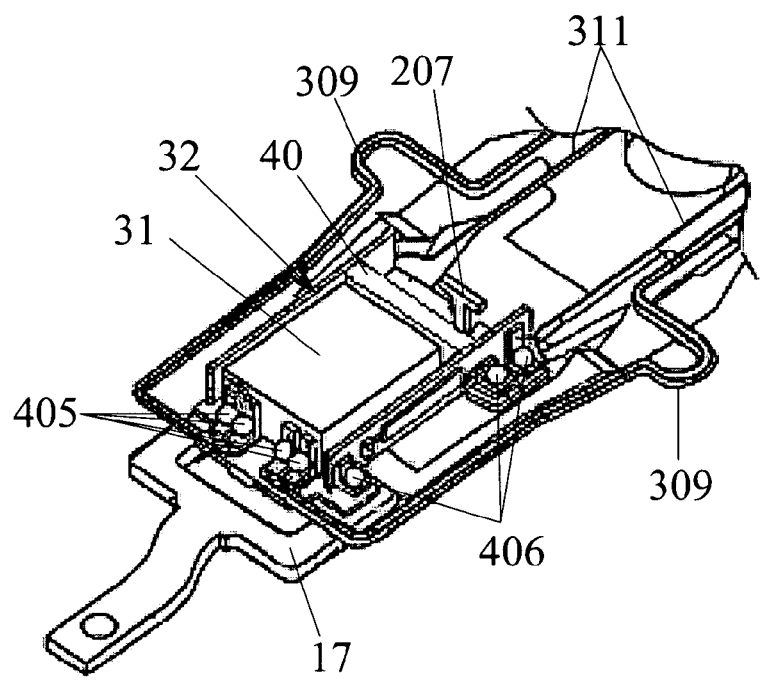
FIG. 5 is a partial, perspective view of the HGA of FIG. 4.

Also referring to FIG. 4, the suspension 8 comprises a load beam 17, a flexure 13, a hinge 15 and a base plate 11. The load beam 17 has a dimple 329 (see FIG. 8) formed thereon. On the flexure 13 a plurality of connection pads 308 are provided to connect with a control system (not shown) at one end and a plurality of electrical multi-traces 309, 311 are provided in the other end. Referring to FIGS. 4 and 5, the flexure 13 also comprises a suspension tongue 328 which are used to support the micro-actuator 32 and the slider 31, and keep the loading force always being applied to the center area of the slider 31 through the dimples 329 of the load beam 17. The suspension tongue 328 has a plurality of electrical bonding pads (not labeled) formed thereon, and the slider 31 has a plurality of electrical bonding pads on an end thereof corresponding to the electrical bonding pads of the suspension tongue 328 to connect therewith by a plurality of metal balls 405 (GBB or SBB), thus establishing an electrical connection between the slider 31 and the suspension tongue 328. Because the electrical bonding pads of the suspension tongue 328 is electrically connected with the multi-traces 309, an electrical connection between the slider 31 and the control system is thus establish by the electric multi-traces 309. As an embodiment, a limiter 207 is formed on the load beam 17 which extends through the suspension tongue 328 for preventing the suspension tongue 328 from being bent overly during normal operation of disk drive or any shock or vibration happening to the disk drive.

Figure 6:
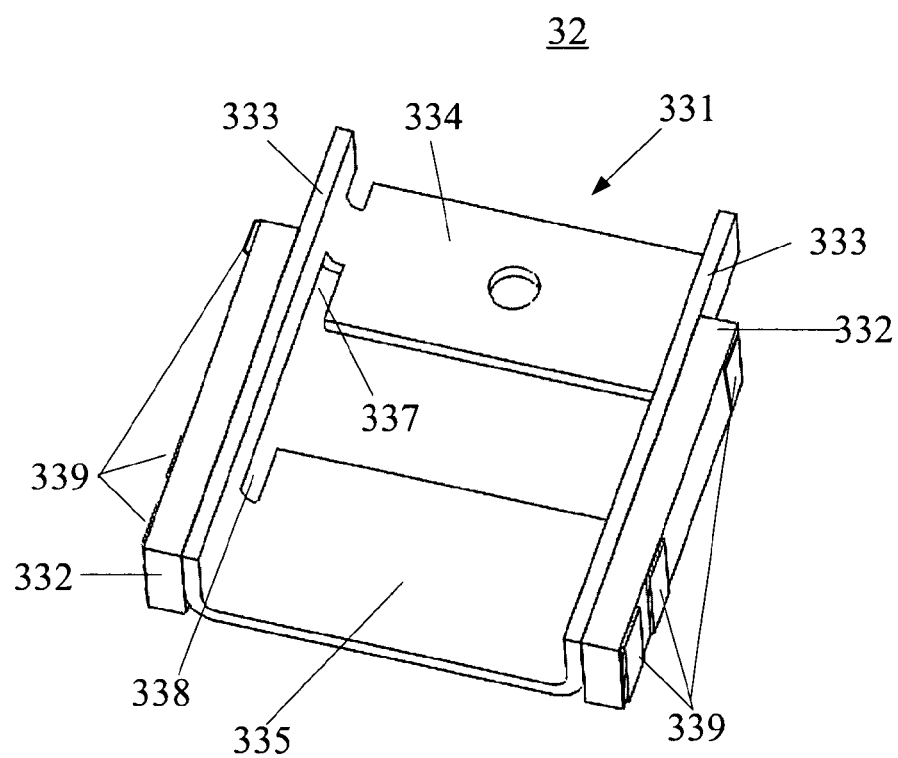
FIG. 6 is a perspective view of a micro-actuator of the HGA in FIG. 4 according to an embodiment of the present invention.
Figure 7:
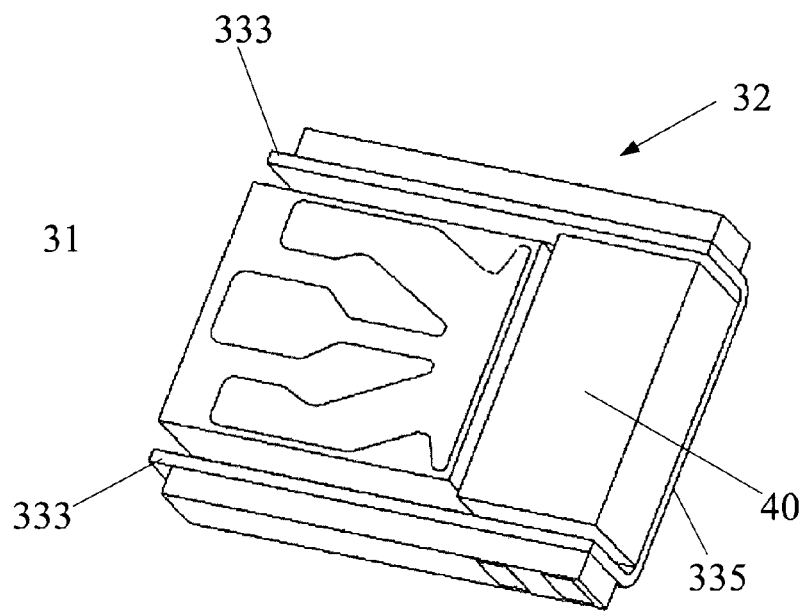
FIG. 7 shows the micro-actuator of FIG. 6 with a slider and the particle filter device of FIG. 2 mounted thereon.

According to an embodiment of the invention, referring to FIG. 6, the micro-actuator 32 comprises a support frame 331 and two piezoelectric (PZT) elements 332. The support frame 331 comprises a top plate 334, a bottom plate 335, and two side arms 333 to connect the top plate 334 with the bottom plate 335. The two PZT elements 332 are bonded to the two side arms 333, respectively. At least one notches 337 are formed between the top plate 334 and one of the side arms 333 so that the top plate 334 can move more freely relative to the side arms 333. Similarly, at least one notches 338 are formed between the bottom plate 335 and one of the side arms 333. Referring to FIGS. 6-7, the slider 31 is mounted on the top plate 334, and a particle filter device 40 is mounted inside of the micro-actuator. In fact, the particle filter device 40 is mounted on the bottom plate 335, which is positioned at leading edge of the slider 31. In the present invention, the slider 31 is bonded to the top plate 334 by adhesive or epoxy dots so that the slider 31 can move together with the micro-actuator 32. In the invention, the PZT elements 332 can be bonded to the support frame 331 by traditional bonding method, such as epoxy bonding, anisotropic conductive film (ACF) bonding. The two PZT elements 332 are preferably made of thin film PZT material which can be a single-layer PZT element or a multi-layer PZT element. As an embodiment, each of the elements 332 has a multi-layer structure, which comprises an inner substrate layer and an outer PZT layer. The substrate layer can be made of ceramic, polymer or metal. The out PZT layer can be a single-layer PZT element or a multi-layer PZT element. In the invention, the micro-actuator may be any other suitable micro-actuator, such as T-shaped micro-actuator, U-shaped micro-actuator.

According to an embodiment of the invention, referring to FIGS. 4-6, the support frame 331 is preferably made of metal material, such as stainless steel. A plurality of electrical pads 339 are provided on one side of each PZT elements 332 and a plurality of electrical pads (not labeled) are provided on the suspension tongue 328 corresponding to the electrical pads 339 of the PZT elements 332 to connect therewith by a plurality of metal balls 406 (GBB or SBB), thus establishing an electrical connection between the PZT elements 332 and the suspension tongue 328. In the invention, because the electrical pads on the suspension tongue 328 are connected with the electric multi-traces 311, thus the PZT elements 332 are electrically connected with the control system by the electric multi-traces 311.

During assembly of the HGA 3, according to an embodiment of the invention, referring to FIGS. 4-7, firstly, bonding the PZT elements 332 to the side arms 333 of the support frame 321 so as to form a micro-actuator 32; then, mounting the particle filter device 40 on the bottom plate 335 of the support frame 321; after that, the slider 31 is attached to the top plate 334 of the support frame 321 with its leading edge adjacent to the particle filter device 40. Subsequently, mounting the support frame 321 on the suspension tongue 328 by its bottom plate 335. Then, electrical bonding the PZT elements 332 and the slider 31 to the suspension tongue 328 and then the control system. Thus a HGA 3 of the present invention is formed. Obviously, the assembly of the HGA 3 can also be performed as follows: coupling the support frame 321 to the suspension 8 firstly, and then mounting the slider 31 on the micro-actuator 32.

Figure 8:
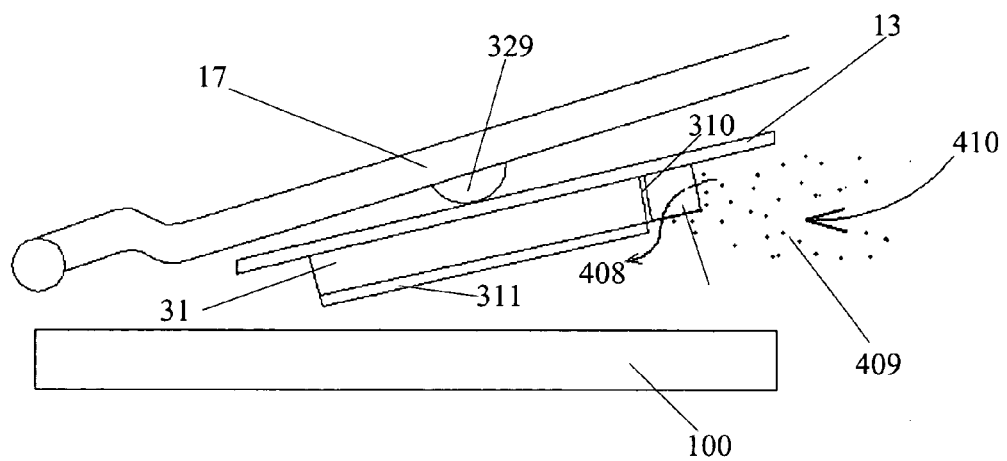
FIG. 8 is a schematic view to illustrate an operation method of the particle filter device of FIG. 2.

FIG. 8 show an operation method of the particle filter device 40 for catching particles from the components in the disk drive such as the HGA. When the slider 31 is loaded on a high speed spinning disk 100, the air flow 410 in a disk drive unit (not shown) may move very fast, which will make the slider 31 flying on the disk 100. Some particles 409 will go with air 408 through the leading edge 310 of the slider 202 and fly on the disk 100. In the invention, because the particle filter device 40 is positioned on the leading edge 310 of the slider 31 that is a passage of the particles 409, the particles 409 will be caught by the particle filter device 40 due to its particle filter part 402 having a plurality of small room therein. Thus the particles 409 will be prevented from flying on the disk 100 and deposited on ABS 311 of the slider 31, this will ensure the slider 31 to read from/write to data information to the disk 100 successfully and eliminate a possibility to damage the slider 31/the disk 100.

Figure 9:
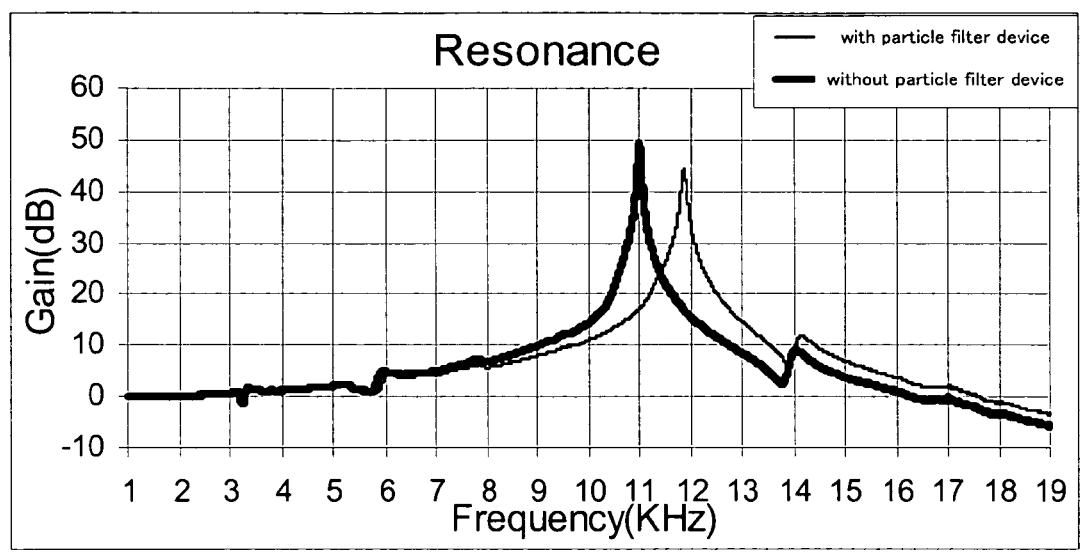
FIG. 9 shows a comparative resonance curve of the HGA of FIG. 4.
Figure 10:
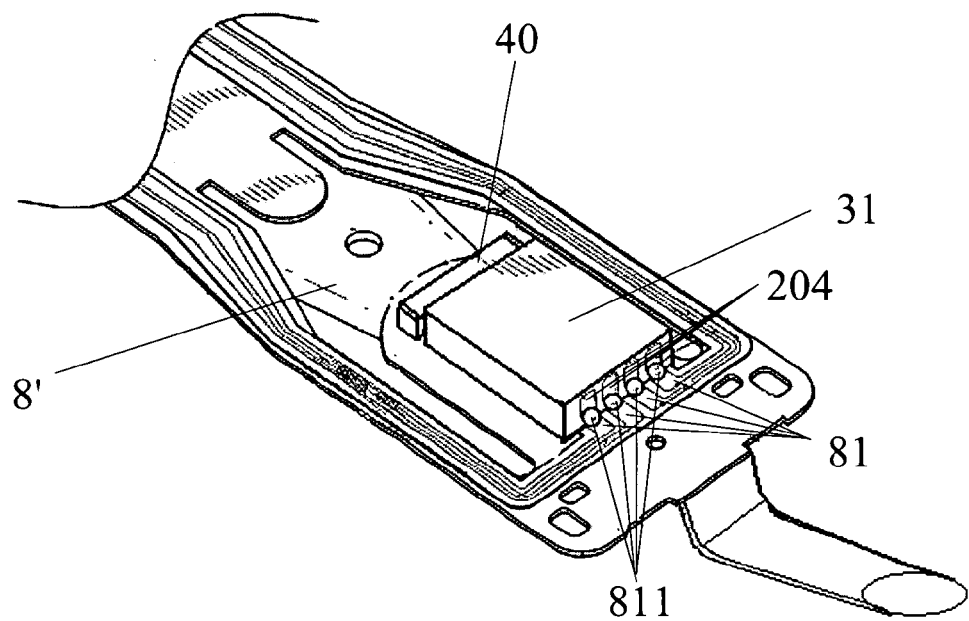
FIG. 10 is a partial, perspective view of a HGA according to a second embodiment of the present invention.
Figure 11:
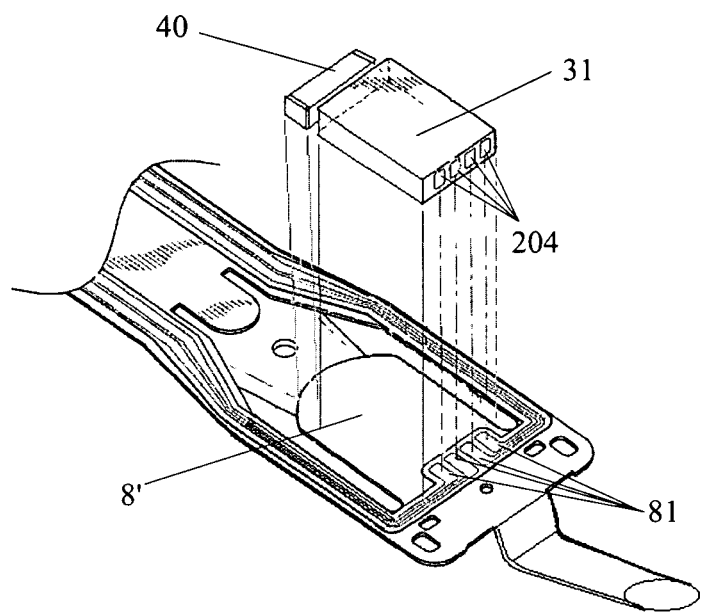
FIG. 11 is an exploded, perspective view of the HGA in FIG. 10.

FIG. 9 shows a testing result of the resonance performance of the HGA 3 of the invention. Here, 501 represents a resonance curve without the particle filter device 40 and 502 represents a resonance curve with the particle filter device 40. In the embodiment, because the micro-actuator 32 comprises a metal support frame 331, which has the PZT elements 332 mounted on its two side arms 333 and only its bottom plate 335 fixed to the suspension tongue 328, so the resonance is not high enough. However, once mounting the particle filter device 40 on the micro-actuator 32, the resonance of the HGA 3 gets improved around 1 kHZ. This would enlarge the servo bandwidth and improve the capacity of the HDD According to another embodiment of the invention, referring to FIGS. 10-11, a HGA comprises a suspension 8', a slider 31 loaded on the suspension 8', and a particle filter device 40 positioned on leading edge of the slider 31. In the invention, the slider 31 and the particle filter device 40 are mounted to the suspension 8' by UV epoxy or adhesive, and the slider 31 is electrically coupled to the suspension 8' by metal ball bonding (GBB or SBB). Obviously, a HGA without a micro-actuator can also catch particles with the help of the particle filter device 40.

Figure 12:
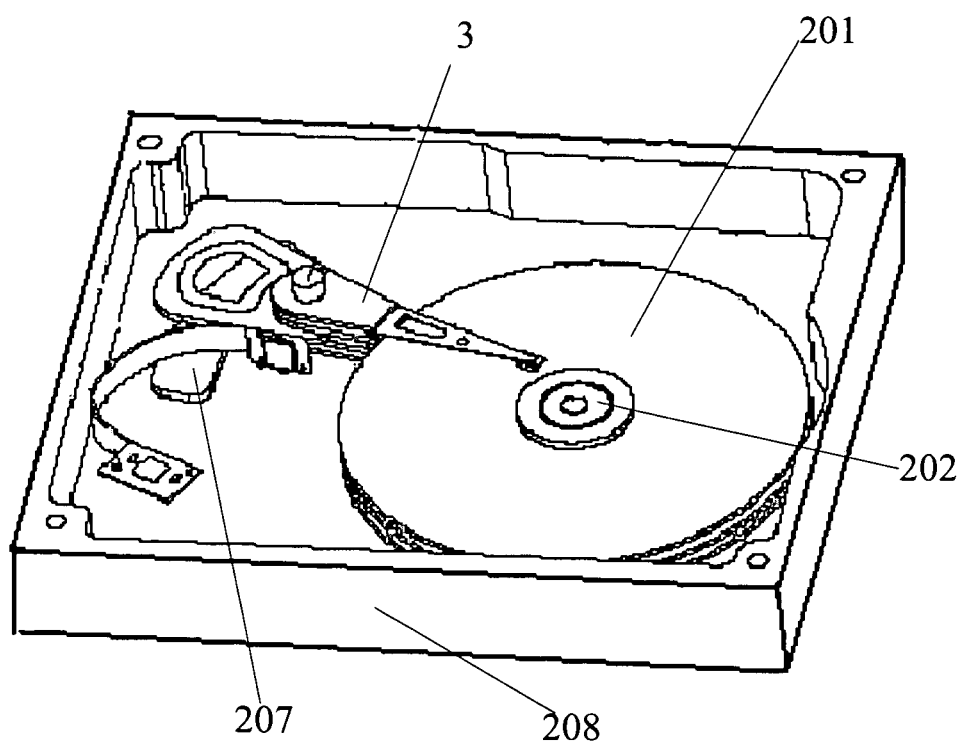
FIG. 12 is a perspective view of a disk drive unit with a HGA of FIG. 4 according to an embodiment of the present invention.

Referring to FIG. 12, according to an embodiment of the invention, a disk drive unit can be attained by assembling a housing 208, a disk 201, a spindle motor 202, a VCM 207 with the HGA 3 of the present invention. Because the structure and/or assembly process of disk drive unit of the present invention are well known to persons ordinarily skilled in the art, a detailed description of such structure and assembly is omitted herefrom.

What is claimed is:

1. A head gimbal assembly comprising:
   a slider;
   a suspension to load the slider; and
   a particle filter device fixed to a leading side of the slider.

2. The head gimbal assembly as claimed in claim 1, wherein the particle filter device is rectangular.

3. The head gimbal assembly as claimed in claim 1, wherein the particle filter device is made of a powder material or a porous material.

4. The head gimbal assembly as claimed in claim 1, wherein the particle filter device comprises:
   a particle filter part having a plurality of small rooms therein; and
   a holder to hold the particle filter part.

5. The head gimbal assembly as claimed in claim 1, wherein the particle filter device is mounted on the suspension by an epoxy or an adhesive.

6. The head gimbal assembly as claimed in claim 1, further comprising a micro-actuator to connect with the slider.

7. The head gimbal assembly as claimed in claim 6, wherein the particle filter device is mounted inside of the micro-actuator.

8. A disk drive unit comprising:
   a head gimbal assembly;
   a drive arm to connect with the head gimbal assembly;
   a disk; and
   a spindle motor to spin the disk;
   wherein the head gimbal assembly comprises:
   a slider;
   a suspension to load the slider; and
   a particle filter device fixed to a leading side of the slider.

9. The disk drive unit as claimed in claim 8, further comprising a micro-actuator to connect with the slider.

\* \* \* \* \*